Feb. 1, 1949. W. L. GARBERDING 2,460,281
METHOD OF AND MEANS FOR MAKING METAL ARTICLES
Filed June 18, 1942 2 Sheets-Sheet 1
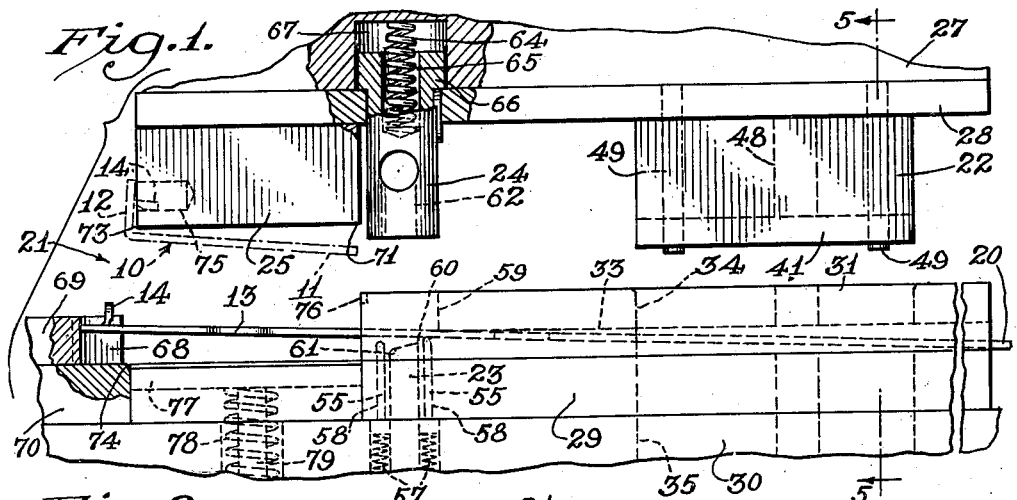
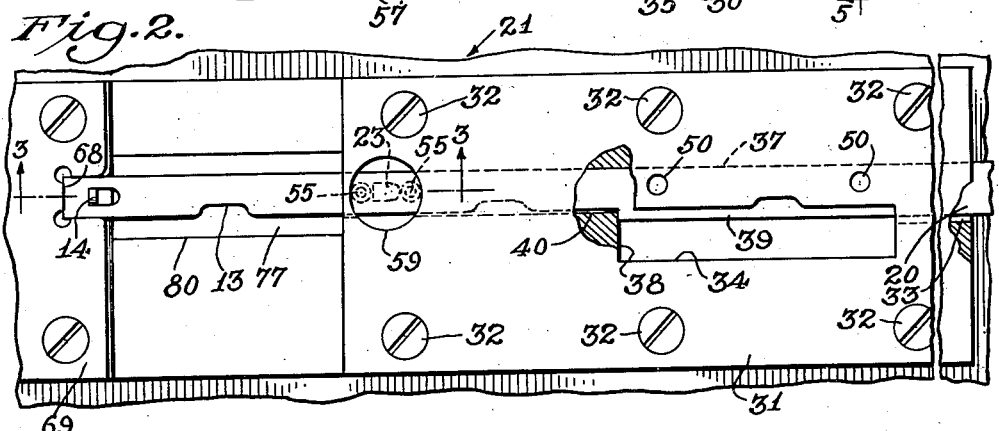
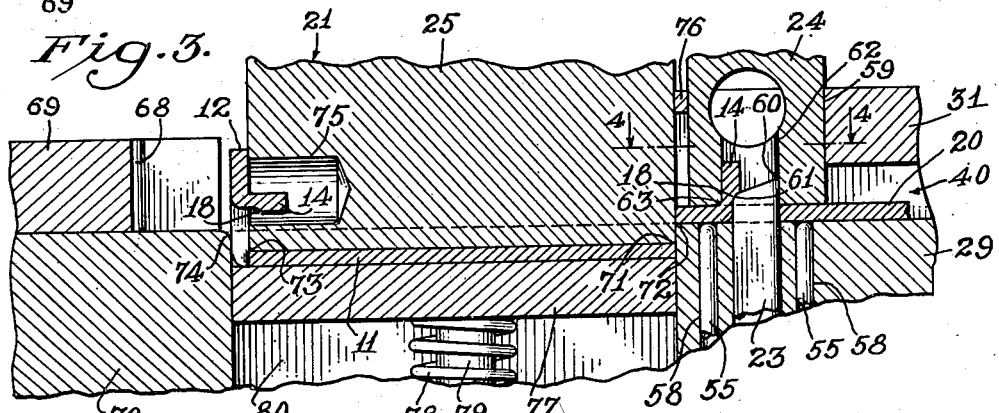
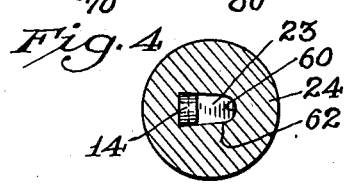
Inventor
Waldo L. Garberding
BY McCaleb, Wendt & Dickinson
Attorneys.

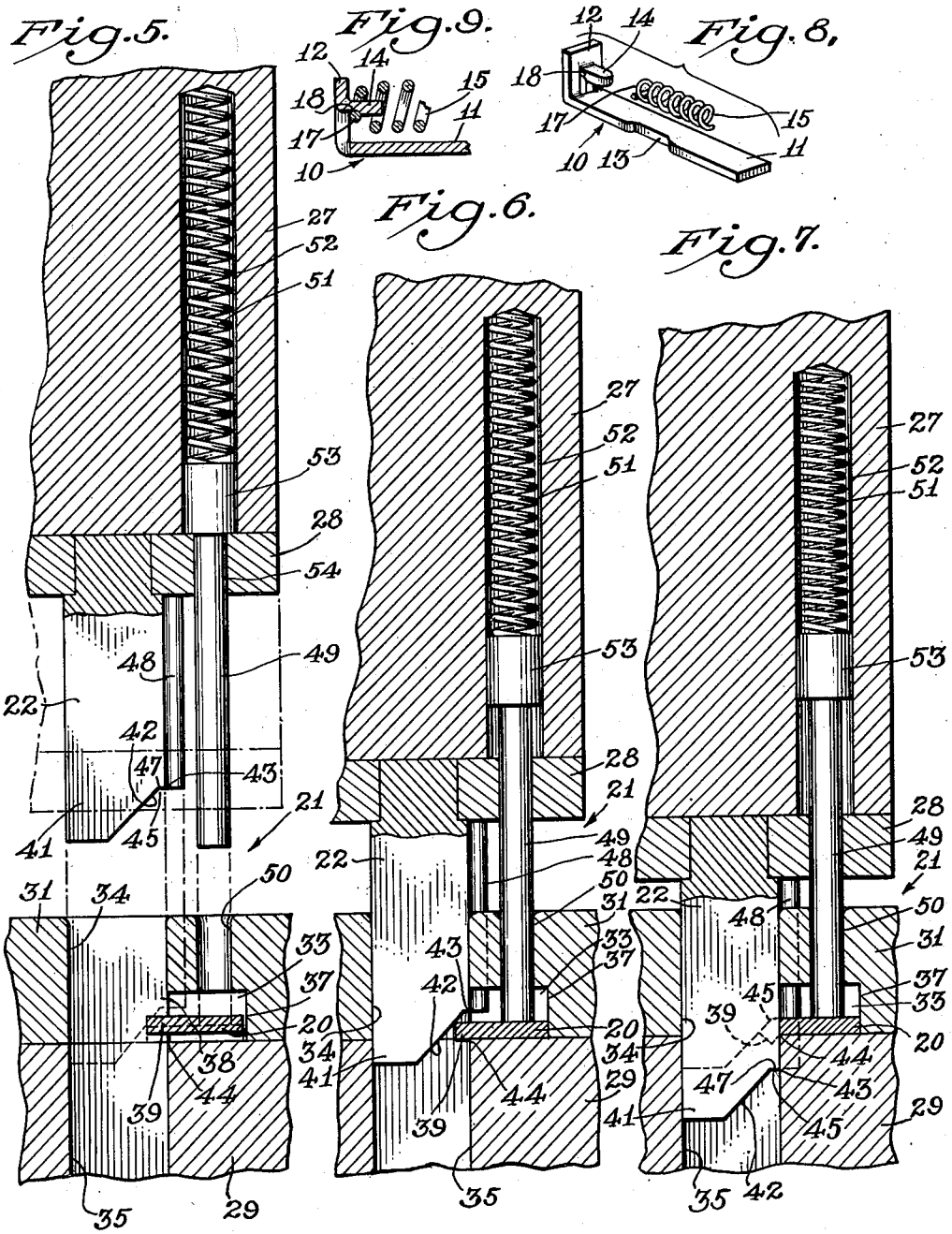

Patented Feb. 1, 1949

2,460,281

UNITED STATES PATENT OFFICE 2,460,281

METHOD OF AND MEANS FOR MAKING METAL ARTICLES

Waldo L. Garberding, Chicago, Ill.

Application June 18, 1942, Serial No. 447,505

15 Claims. (Cl. 153—2)

My invention relates to a method of and means for making metal articles and is more particularly concerned with the manufacture of finger stops which are adapted for use in progressive or gang type metal forming dies.

One of the objects of my invention is to simplify and economize in the manufacture of certain sheet metal articles by producing them in a manner which avoids the complexities and the waste of material in scrap that would result from the conventional way of making such articles by compound or blanking die methods.

Another object is to make narrow, elongated, formed metal articles from narrow strips of material of approximately the same width which may be derived from sheets specially sheared into strips or, more economically, from strips of scrap material salvaged from the trimming down of metal sheets intended for other uses.

Still another object is to effect important improvements in the accurate trimming of strip material in the punch press manufacture of metal articles.

A further object is to provide a novel method of and means for providing a sheet metal article with an integrally struck out tongue or finger, and more particularly such a tongue or finger formed with a grooved base.

It is also an object of the invention to provide a novel method and means for progressively trimming, punching, forming and cutting off articles made from sheet metal strips.

The invention also contemplates the provision of a simple, efficient, and rugged punch press apparatus for the quantity production of finished metal articles, which is economical in operation and will operate for long periods without requiring adjustment, sharpening or other attention.

Other objects and advantages of the invention will be apparent from the following description and the accompanying drawings, in which similar characters of reference indicate similar parts throughout the several views.

Referring to the drawings of which there are two sheets:

Figure 1 is a front elevational view of a combination die structure embodying features of the invention;

Fig. 2 is a top plan view of the stripper and certain other parts of the die, with some areas broken away and in section to show details of construction;

Fig. 3 is an enlarged longitudinal vertical sectional detail view taken substantially along lines 3—3 of Fig. 2 and showing parts of the die apparatus in the relationship assumed upon completion of the forming stroke;

Fig. 4 is a horizontal sectional detail view taken on the plane of the line 4—4 of Fig. 3;

Fig. 5 is an enlarged transverse vertical sectional detail view taken substantially along line 5—5 of Fig. 1;

Figs. 6 and 7 are sectional views similar to Fig. 5 but showing the cooperating parts in different respective relationships at progressive stages of operation;

Fig. 8 is a perspective assembly view of a finger stop, the body of which is adapted to be made according to the present invention; and Fig. 9 is a fragmentary longitudinal vertical sectional view through the presser head or thumb flange end portion of the finger stop.

According to my invention, a sheet metal strip is progressively converted into a succession of identical finished articles by a series of operations all of which are preferably performed simultaneously on successive article-blank sections of the strip. The strip is advanced by article-blank section increments to subject each section step by step to each successive operation. In order, from first to last, the operations may include trimming the width of the selected section of the strip of material to accurate dimension, then punching the trimmed section of the strip to provide it with an angularly struck-out grooved-base tongue, and, lastly, forming and severing the trimmed and punched section from the strip. The resulting article is accurate as to width and utilizes all of the component section of the strip material except for the very small amount of scrap which may be trimmed away from one side of the blank where the strip is wider than required.

Having reference now to the drawings, an article made according to my invention may comprise a finger stop 10 (Figs. 8 and 9) such as is adapted to serve as a starting device for a progressive or gang forming die of a punch press. The stop 10 comprises an elongated relatively narrow stop leg 11 formed from a suitable gauge sheet metal and having an integral, relatively short, right-angular presser head or thumb flange 12 at one end. Intermediate its ends, the stop leg 11 has on one edge an elongated shallow notch 13 to provide a limit pin clearance. Struck out from the thumb flange 12 is an integral right-angular tongue or supporting finger 14 which overlies the leg 11 in parallel relation. This finger is preferably of taper pointed shape so that it can be assembled with a compressible return coil spring 15 by a relative axial sliding assembly movement into an ensmalled interengaging end loop 17 on the spring which is thereby gradually expanded until it snaps into an anchoring groove 18 formed for this purpose across the base of the supporting finger. In this manner the spring 15 is held against unintentional separation from the finger 14 but may be removed if necessary by forcing the end loop 17 off of the finger. For a more detailed description of the finger stop 10 and its use, reference is invited to my copending application Serial No. 446,978, filed June 13, 1942, now Patent No. 2,340,805, issued February 1, 1944.

The one-piece body of the finger stop 10 is adapted to be made from a simple strip 20 of sheet metal such as dead soft cold rolled steel. This strip is preferably only slightly wider than the finished width of the stop body and, as has been found very advantageous in practice, may comprise scrap trimmed from sheets of the selected gauge of material derived from shearing down sheets for making some other article. Where the body of the finger stop is to be $\frac{5}{16}$" wide, the strip 20 may be up to $\frac{7}{16}$" or $\frac{1}{2}$" wide.

In transforming the strip of material 20 into a finger stop body, a selected blank section of the strip is trimmed accurately to the desired stop body width while at the same time cutting the limit pin clearance notch 13, whereafter the trimmed blank section is punched to provide the spring supporting and anchoring tongue 14, and then the trimmed and punched blank section is bent to provide the thumb flange 12 and, as completed, is sheared off from the strip. All of these steps are performed in a combination die assembly 21 (Fig. 1), which includes a downwardly movable trimming punch structure 22, an upwardly projecting stationary tongue-striking male punch 23 and cooperating downwardly movable die or female punch 24, and a downwardly movable cut-off and forming punch 25. A reciprocable punch head or holder 27, including a punch back 28, supports the trimming punch 22, the female punch 24, and the cutoff and forming punch 25, and is adapted to be supported by the ram of a punch press (not shown) in which the holder is driven through a punching cycle relative to a die block 29, mounted upon a die bed 30 and carrying the male punch 23. The die block 29 supports a stripper 31 which is removably secured thereto as by means of screws 32. The stripper 31 provides a guideway or gauge for the strip of material 20 and for this purpose is provided with a longitudinal downwardly facing guideway channel 33 in its lower face.

Upon introducing the leading end of the strip of material 20 into the guideway channel 33, it comes first under the trimming punch 22 where a blank section of the strip equal to the full length of the body of the finger stop is accurately trimmed to the finger stop width. The first part of the channel 33 leading to the trimming punch is of ample width to accommodate a strip substantially wider than the trimmed blank.

According to the present invention, all trimming is effected in a simple punching operation and metal is trimmed away from only one side of the strip. To this end, the trimming punch 22 is elongated longitudinally of the path of travel of the strip of material 20 and has an effective length corresponding to the full length of the blank to be trimmed. A punch hole 34 (Figs. 2 and 5) in the stripper 31 registers with and guides the punch 22 to a punch hole 35 in the die block 29. The inner longitudinal edge of the punch hole 35 is parallel with the opposite wall identified at 37 of the guideway channel 33 and is spaced therefrom exactly equal to the desired width of the trimmed blank. Thus, when the strip of material 20 is held with one edge against the gauging channel wall 37, the punch 22 upon entering the punch hole 35, will trim off any excess material which projects into its path along the opposite edge of the strip.

In order to gauge incremental advance of the stock strip 20, the inner end wall defining the stripper punch hole 34 provides a gauging shoulder 38 engageable by the leading end of the excess material to be trimmed off, indicated at 39, of each of the blank sections. After the excess material 39 is trimmed away, the trimmed section may be advanced through a succeeding narrower portion 40 of the gauging channel 33 (Fig. 2).

Not only does the trimming punch 22 trim away the excess width of the stock strip 20, but it also, as an initial action preceding actual trimming, forces the strip edgewise firmly against the abutment provided by the gauging channel wall 37. Thus, referring to Figs. 5, 6 and 7, the punch 22 is formed with a depending nose portion 41 having an inwardly facing slanting pressure shoulder 42 which extends at preferably approximately 45° to the plane of the stock strip 20. The shoulder 42 is adapted for slidably engaging the adjacent edge of the strip 20 and gradually applying increasing force in the plane of the strip toward the abutment wall 37 as the punch descends in a punching stroke. The dot-dash outline of the punch 22 in Fig. 5 indicates its position at the moment of initial contact of the slanting pressure shoulder 42 with the edge of the stock strip 20. As the punch continues to descend from this position toward the position shown in Fig. 6, gradually increasing pressure is applied to the edge of the stock strip serving not only to move the strip laterally in its plane toward the abutment wall 37, but also to straighten out the wall-engaging edge of the strip. The remaining marginal edge portion 39 of excess material at this point overhangs the punch opening 35. The slanting arrangement of the shoulder 42 enables the accommodation of varying widths in the stock strip 20. In the continuing descent of the punch 22, the excess material 39 may be peened over by the uppermost portion of the pressure shoulder 42 as shown in dot-dash outline in Fig. 7 and is finally sheared off clean by a shearing edge 43 on the punch cooperating with a stationary shearing edge 44 at the adjacent upper side of the punch opening 35. The peened-over and then sheared-off scrap strip 39 is accommodated in a narrow scrap clearance 45 between the shearing edge 43 and the adjacent face of the inclined pressure face 42. At its trailing end, the scrap strip 39 is sheared from the stock strip 20 by a short shearing edge 47 formed on the punch at that end of the scrap clearance gap 45. The severed scrap 39 drops away down the punch hole 35.

After the punch 22 is fully withdrawn, the stock strip 20 may again be advanced a blank length increment determined by stopping engagement of the freshly sheared leading edge of the excess material on the next succeeding blank with the gauging shoulder 38.

Coincident with the width trimming action of the punch 22, a lateral notching projection 48, integral with the punch, shears out the limit pin clearance notch 13 in the edge of the blank. The resulting slug of scrap is, of course, integral and drops away with the scrap strip 39.

Any tendency of the stock strip 20 to tilt up under the influence of the downward force applied to the scrap edge portion 39 of the strip by the punch 22 is overcome by means such as hold-down pins 49. In the present instance there are two of the hold-down pins 49, one adjacent to each opposite end of the blank to be trimmed, at points inwardly of the longitudinal center of the stock strip so as to increase the length of the hold-down leverage by applying the hold-down force as far removed as practicable from the fulcrum provided by the shearing edge 44 of the die.

As the trimming punch 22 descends toward engagement with the blank, the hold-down pins 49 engage the blank in advance of the initial contact of the punch with the scrap edge portion 39. For this purpose, the hold-down pins 49 are preferably long enough to extend a limited distance below the lower edge of the punch nose 41. Holes 50 in the stripper 31 guide the hold-down pins 49 squarely against the blank.

In the continued descent of the punch 22, the hold-down pins 49 are adapted to apply progressively increasing hold-down pressure against the blank substantially proportionate to increase in wiping pressure of the shoulder 42 in the advance of the punch 22, until the maximum hold-down pressure is exerted as shearing of the scrap edge portion 39 takes place. For this purpose, the hold-down pins 49 are normally urged toward hold-down by respective compression springs 51 which are located within coaxial bores 52 in the punch holder 27 and bear resiliently against increased diameter heads 53 on the inner ends of the associated pins. The heads 53 are slidable within their bores 52 and in the fully extended position of the pins, rest against the inner face portions of the punch back 28 surrounding respective pin-passage bores 54 (Fig. 5).

After further descent of the hold-down pins 49 is stopped by engagement with the stock blank, the springs 51 yield to permit retraction of the pins upwardly within the bores 52 while the punch 22 continues advancing (Fig. 6) toward shearing (Fig. 7). At the same time, the springs 51 are compressed and thus loaded to exert progressively increasing force counteracting the retraction of the pins. This force is transmitted by the pins to the blank which is thereby held ever more firmly against the underlying surface of the punch block 29. In the return of the punch 22, the hold-down pins 49 serve in the nature of stripper pins to hold the newly sheared blank down flat and avoid tilting up of the sheared edge by wiping action of the side face of the punch as it returns thereby.

As the trimmed blank is advanced from the trimming station to the finger punching station, it is guided into position over the upwardly protruding stationary punch 23 by the rear one of a pair of identical rounded tip stripper pins 55 which project above and flank the punch on the longitudinal median line of the reduced width stripper guide channel portion 40 and are normally held extended by compression springs 57 (Fig. 1). The depth of the reduced width channel portion 40 is sufficient to afford ample clearance above the punch 23 for the uptilting of the stock strip 20 thereover. During punching, the stripper pins 55 are adapted to yield and retract slidably within respective die block bores 58 in opposition to the springs 57.

In the punching operation, the movable female punch 24 extends through a guide aperture 59 in the stripper plate 31, engages the top face of the blank, and drives it against the punch 23 which pierces the blank and strikes out the finger 14 (Fig. 3). For this purpose the punch 23 has a similar cross-sectional shape as the outline of the finished taper-pointed finger 14 and has a raised shearing point 60 from which the upper end of the punch tapers down toward a rounded heel 61. The latter is designed to apply transverse and longitudinal components of metal displacing pressure to the adjacent base portion of the finger 14 to form the anchoring groove 18. The movable punch 24 has a longitudinally extending shearing edge bore 62 which is of cross-section generally complementary to and is cooperative with the male punch 23 and arranged for snugly receiving the punch 23 and the base of the struck-out finger 14 therein (Fig. 4). A rounded-off shoulder 63 on the punch 24 compressively opposes the groove-forming heel 61 at the opposite side of the finger 14 by being spaced from the heel less than the thickness of the metal of the tongue. As shown in Fig. 1, the movable punch 24 extends down to be effective well ahead of the shearing action of the punches 22 and 25, thus driving the up-tilted strip 20 down substantially flat against the die block 29 before the latter punches can bend the strip down at either side of the punch 23.

Transverse strain upon the stationary punch 23 resulting from the groove-pressing action of the heel 61 is, of course, strongly resisted by reason of the greater dimension of the punch in the direction of the transverse component of compression force generated. Any unusual transverse distorting strain that may nevertheless arise, is adequately counteracted by the snug slidable engagement of the stationary punch with the walls defining the shearing and receiving bore 62 in the movable punch 24. Moreover, the side walls of the punch bore 62, adjacent the shoulder 63, being spaced the same as the base width of the finger 14, prevent formation of burrs due to edgewise flow of the metal displaced in the formation of the anchoring groove 18, but may cause the metal flow to be reflected in a slight elongation of the finger. This maintains the base width of the tongue within predetermined limits to facilitate subsequent reception of the anchoring loop 17 of the return spring of the stop.

Smooth positive operation of the female punch 24 is enhanced by a yieldable mounting thereof. To this end, it is keyed for non-rotary longitudinal sliding movement through the punch back 28 (Fig. 1). A strong compression spring 64 maintains the punch 24 normally in extended condition even throughout the punching stroke until the blank is substantially flat against the die block 29. The spring 64 is partially received within an axial bore 65 formed in an enlarged head 66 providing a limit shoulder for the punch and having a limited range of axial movement within a socket 67 in the punch holder 27. After the punch 24 reaches the end of its punching stroke, yielding of the spring 64 permits a compensating movement of the punch head 27 independent of the punch 24 calculated to enable movement of the punches 22 and 25 to the limit of their punching strokes, whereupon the head 66 comes into solid engagement with the inner or top wall of the socket 67 so that the lower end of the punch 24 is driven into final solid, squaring engagement with the blank (Fig. 3).

Upon separation of the punches 23 and 24, the stripper pins 55 operate by expansion of the springs 57 to strip the punched blank from the stationary punch 23. Should the blank stick to the female punch 24 even though the tapered shape of the tongue 14 limits engagement of its sides with the adjacent widest portion of the bore 62, separation is effected when the blank strikes the roof of guideway channel portion 40.

Upon being advanced from the finger-punching station, the blank reaches the final cutoff and forming station under the punch 25 (Figs. 1 and 2). Here the leading end of the stock blank is received within a centering and gauging opening 68 in a gauge plate 69 which is mounted on a forming block 70. The gauging opening 68 is of a length to receive and delimit the end portion of the blank which will form the thumb flange 12 of the stop body.

Longitudinally of the blank, the punch 25 is dimensioned equal to the inside length of the stop leg 11. The lower end of the punch 25 is squared up and the edge nearest the trailing end of the blank serves as a shearing edge 71 which cooperates with a stationary shearing edge 72 (Fig. 3) on the die block to sever the blank from the strip.

Simultaneously with the shearing action, the opposite edge of the cutoff and forming punch 25 cooperates as an angle former 73 with a rounded forming shoulder 74 on the forming block 70. The opposing vertical faces of the punch 25 and the forming block 70 are spaced apart a distance equal to the thickness of the material of the blank. Thus, as the punch 25 descends upon the positioned blank, the forming edge 73 causes the projecting end portion of the blank to wipe down over the forming shoulder 74 and bend up against the adjacent vertical end face of the punch within which is a clearance bore 75 for receiving the finger 14 of the now formed thumb flange 12. The longitudinally directed component of force resulting from the forming action is resisted by the inherent rigidity of the punch 25, and in addition, by a bridge 76 of stripper plate material and by the die block face along which the shearing edge 71 moves downwardly following the shearing action.

To assure flat, square formation of the punch leg 11, a pressure pad 77 is mounted upon a coiled compression spring 78 for resiliently opposing the punch 25. A locating stem 79 depends from the pad 77 into the spring 78, and the entire pad assembly is held for vertical sliding movement within a well 80. The pressure pad 77 normally lies with its upper surface substantially coplanar with the upper surface of the die block 29 and then yieldably follows the cutoff and forming punch 25 down to the end of its stroke while maintaining firm pressure against the interposed stop leg 11. As the punch 25 returns, the pad 77 follows and returns to its upper limit, thus pushing the finished article up out of the well 80 to be carried clear of the die by momentary catching of the finger 14 upon the lower wall of the clearance bore 75, substantially as shown in dot-dash outline in Fig. 1. By having the die structure mounted in a tilted bed press, the finished article will then automatically drop away of its own weight, thus clearing the punch 25 for an immediate return punching stroke.

From the foregoing it will be apparent that commencing with the third punching stroke after introduction of the strip 20 into the combination die structure, and with each punching stroke thereafter until the strip is used up, a finished die stop body is produced. This is accomplished with a bare minimum of scrap utilizing simple strip stock.

A high degree of accuracy is attained in the width of the finished article simply and without any blanking out operation but by the improved side trimming action. Other dimensions are also maintained within reasonably close limits. The novel simultaneous punching and grooving of the struck-out tongue or finger is of substantial advantage in simplifying manufacture and speeding production. Because of its relatively simple construction and small number of operating parts, the die assembly can be easily and quickly set up for operation and will give long trouble-free service. Any repairs that may from time to time be necessary, can be simply and expeditiously effected.

After the body of the stop 10 has been completed in the die, it is hardened ready for use. Then the spring 15 is assembled therewith by slipping the anchoring end loop 17 onto the supporting finger 14 until snapping engagement of the loop into the anchoring groove 18 is effected. The finger stop is then ready for installation in a progressive or gang die.

While I have illustrated a preferred embodiment of my invention, many modifications may be made without departing from the spirit of the invention, and I do not wish to be limited to the precise steps or details of construction as set forth, but desire to avail myself of all changes within the scope of the appended claims.

Having thus described my invention, what I claim as new and desire to secure by Letters Patent of the United States is:

1. The method of making a finger stop which comprises striking an integral spring-supporting tongue to extend angularly from one end portion of a relatively soft elongated sheet metal blank, bending said end portion into right-angular relation to the remainder of the blank and with the tongue overlying said remainder of the blank, and hardening the formed blank.

2. Apparatus for making articles from a sheet metal strip comprising, in combination, a base, means for holding the strip down against the base, a gauging abutment, means for forcing one side of the strip edgewise against the abutment with gradually increasing pressure, and means for trimming excess material from the opposite side of the strip while the strip is held against the abutment with maximum pressure.

3. In combination in apparatus for making an article from a sheet metal strip, a die block, a stripper providing a gauging abutment for an edge of the strip while the strip is lying upon the die block; a trimming punch including means for engaging one edge of the strip and forcing the strip in its plane into engagement at its opposite edge with the gauging abutment, said punch having a shearing edge adjacent to the forcing means for severing excess material from the edge portion of the strip engaged by the latter, and means for holding the strip down against the die block while the trimming punch is acting on the strip.

4. In combination in apparatus for making an article from a strip of sheet metal, means comprising a stationary base to receive the strip flatwise, a shearing edge on one side of said base, a gauging and straightening abutment spaced inwardly from said shearing edge, a reciprocably mounted member having a pressure shoulder engageable with the side edge of the strip nearest said sharing edge to force the strip in its plane toward said abutment for engagement of the latter by the opposing side edge of the strip, a shearing edge on said member cooperative with shearing edge on the base for trimming excess material from the shoulder-engaged side of the strip, said shoulder being so related to the shearing edge on the member that gradually increasing pressure is applied thereby to the edge of the strip as such shearing edge approaches shearing position, and means co-ordinated in action with said member for holding the strip against tilting relative to said base under the influence of said member and releasing the strip automatically when said member is withdrawn from contact with the strip.

5. In combination in apparatus for making articles from sheet metal having substantial thickness, a stationary punch, and a movable punch cooperative with the stationary punch for partially severing a tongue of material from a blank of the sheet metal, one of the punches being of substantially the same cross-sectional shape as the outline of the tongue and having its punching end surface on a slant relative to the plane of the blank to be punched, shearing edges bordering said end surface except where the base of the tongue is engaged and there having a rounded-off heel, the other of the punches having a bore dimensioned to receive said one punch and the struck-out tongue snugly, the mouth of the bore in said other punch being defined by shearing edges shearingly cooperative with the first-mentioned shearing edges and an angle forming shoulder engageable with the opposite side of the base of the tongue from said heel, the opposing surfaces of said shoulder and said heel being in the fully interengaged relation of the punches spaced apart less than the thickness of the metal of the tongue so that said heel presses into the base portion of the tongue and displaces metal therefrom to form a transverse groove.

6. In sheet metal forming apparatus, a pair of relatively axially reciprocable punches, one of said punches having a bore with a cross-sectional shape substantially like the outline of a tongue to be struck from a sheet metal blank, the other punch being of end shape complementary to said bore and adapted when the punches are brought together to cooperate shearingly with said one punch for partially severing the tongue from the blank and bending it out of the plane of the blank into said bore, said last mentioned punch having means operative when the punches are in cooperating relation to form a groove in the tongue, and means for stripping the tongued blank from the punches when they are separated.

7. In combination in apparatus for making the body part for a finger stop from a strip of sheet material, means for gauging the width of a longitudinal blank section of the strip, means for trimming excess material from one longitudinal margin of the blank, means beyond said trimming means for striking out an integral supporting finger right-angularly adjacent one end of the blank, means for engaging the freshly severed end of the untrimmed excess marginal material on the succeeding blank to gauge the positioning of the newly trimmed blank relative to said finger-striking means, and means at an advanced location relative to the striking-out means for right-angularly bending the trimmed and befingered blank on a transverse line adjacent to the finger to divide the blank into a thumb flange and a longer stop leg and bring the finger into substantially parallel relation to the stop leg.

8. In combination in apparatus for making a tongued article from a sheet metal strip of substantial thickness, mechanism for striking an integral tongue right angularly from the body of the strip, said mechanism including means for entering into the metal of the tongue and displacing the metal of the tongue from a narrow area across the base of one face of the tongue to form a spring-receiving groove depressed into the contiguous face of the tongue, and means for confining the displaced metal against spreading edgewise of the tongue.

9. In combination in apparatus for making articles from a strip of relatively stiff sheet material, means for gaging the width of a longitudinal blank section of the strip adjacent its leading end, the length of such blank section being substantially less than the total length of the strip, means for trimming excess material from one longitudinal margin of that section and forming a forwardly facing shoulder at the severed end of the untrimmed excess material on the succeeding blank portion of the strip, and means for engaging said shoulder to stop and position the next succeeding blank section of the strip to be trimmed when the strip is advanced to carry the first trimmed section therebeyond.

10. The method of making an article from a sheet metal strip which, for conservation of metal, is too narrow to permit of the conventional trimming of both sides of the strip, since there is inadequate scrap allowance for a conventional trimming die or like means to make adequate trimming engagement with both sides of the strip simultaneously, which method comprises forcing the strip in its plane to drive one longitudinal edge against a width gauge with adequate pressure to correct deviations from required delineation of the gauged edge, trimming excess material or scrap allowance from the opposite edge of the strip, and while the strip is being thus trimmed holding it firmly against tilting relative to or away from the gauging abutment during the trimming.

11. The method of making a finger stop body from a strip of sheet metal which comprises trimming the strip to proper width, striking out of one end section of the strip an integral finger to extend at right angles to the plane of said section, and then bending the finger-carrying section into right-angular relationship to the remainder of the strip and with the finger extending in parallel and overlying relation to said remainder of the strip in position to receive a coiled return spring and support such spring in overlying relation to said remainder of the strip with its axis parallel thereto.

12. The method of making an article from a strip of material which comprises holding the strip down against a base, forcing the strip edgewise with gradually increasing pressure against a width-gauging abutment, and then, while maintaining the edgewise pressure at maximum, trimming excess material from the free edge portion of the gauged strip.

13. In apparatus of the character described, a trimming punch adapted to trim excess material from an edge of a strip lying upon a trimming bed and projecting edgewise beyond said bed over a shearing edge to the extent to be trimmed away, said punch having an inclined shoulder adapted to engage the trimming edge of the strip with gradually increasing pressure applied transversely in the plane of the strip toward the opposite edge thereof to drive the latter edge against a gauging abutment, and a shear cooperating with said shear edge of the bed to trim said excess material from the strip after said shoulder has functioned to apply the maximum gauging pressure practicable to the strip.

14. In apparatus for making articles from sheet metal of substantial thickness, means for partially severing and striking out angularly from a blank of the sheet metal an elongated tongue, means acting in concert with said severing means to enter into and displace a sufficient amount of metal from across the base of the tongue to form a transverse groove sunk to substantial depth within the contiguous face plane of the tongue, the depth of said groove being sufficient to enable the interlocking therein of an element to be assembled with the tongue, and means for actuating all of said means.

15. In combination in apparatus for making articles from relatively stiff sheet metal, means for punching an integral tongue angularly from adjacent to one end of a blank section of a strip of the material, a reciprocable member for engaging the strip after a tongue has been punched therefrom, and means adapted to cooperate with said member, upon relative movement of the member and the cooperating means with the blank operatively disposed between them, for bending a section of the blank containing said tongue into angular relation to the remainder of the blank and with the tongue projecting from the inside face of the angularly bent section toward the reciprocable member, said reciprocable member having a tongue-receiving opening so located that as the bent section is bent relative thereto, said tongue is received in said opening, said opening being defined by a wall disposed to engage the tongue during the reciprocal movement of said member subsequent to the bending operation and displace the formed blank from the forming position.

WALDO L. GARBERDING.

REFERENCES CITED

The following references are of record in the file of this patent:

UNITED STATES PATENTS

| Number | Name | Date |
|---|---|---|
| 16,290 | Skeels | Dec. 23, 1856 |
| 231,209 | Brooks et al. | Aug. 17, 1880 |
| 272,202 | Bradley | Feb. 13, 1883 |
| 277,923 | Packard | May 22, 1883 |
| 352,359 | Schmiedl | Nov. 9, 1886 |
| 516,696 | Bartlett | Mar. 20, 1894 |
| 595,108 | Levedahl | Dec. 7, 1897 |
| 678,002 | Miller | July 9, 1901 |
| 744,014 | Lewis et al. | Nov. 10, 1903 |
| 979,142 | Fahnestock | Dec. 20, 1910 |
| 1,303,520 | Swaidmark | May 13, 1919 |
| 1,526,518 | Wentworth | Feb. 17, 1925 |
| 1,535,777 | Hoxie et al. | Apr. 28, 1925 |
| 1,674,661 | Pleister et al. | June 26, 1928 |
| 1,787,255 | Klocke | Dec. 30, 1930 |
| 1,800,443 | Dustan et al. | Apr. 14, 1931 |
| 1,820,440 | Conard | Aug. 25, 1931 |
| 1,890,471 | Rutherford | Dec. 13, 1932 |
| 1,931,420 | Wakefield | Oct. 17, 1933 |
| 2,019,518 | Widell | Nov. 5, 1935 |
| 2,081,038 | Keller | May 18, 1937 |
| 2,084,967 | Babb | June 22, 1937 |
| 2,133,595 | Thomas | Oct. 18, 1938 |
| 2,153,388 | Newman | Apr. 4, 1939 |
| 2,203,738 | Nash | June 11, 1940 |
| 2,251,434 | Weiss et al. | Aug. 5, 1941 |